United States Patent
Qi et al.

(10) Patent No.: US 10,348,380 B1
(45) Date of Patent: Jul. 9, 2019

(54) METHODS AND APPARATUS FOR SINGULAR VALUE DECOMPOSITION WITH NORM SORTING

(71) Applicant: Marvell International Ltd., Hamilton (BM)

(72) Inventors: Yihong Qi, Santa Clara, CA (US); Xiayu Zheng, San Jose, CA (US)

(73) Assignee: Marvell International Ltd., Hamilton (BM)

( * ) Notice: Subject to any disclaimer, the term of this patent is extended or adjusted under 35 U.S.C. 154(b) by 0 days.

(21) Appl. No.: 15/611,050

(22) Filed: Jun. 1, 2017

Related U.S. Application Data

(60) Provisional application No. 62/344,615, filed on Jun. 2, 2016.

(51) Int. Cl.
  *H04B 7/06* (2006.01)
  *H04L 25/02* (2006.01)
(52) U.S. Cl.
  CPC ....... *H04B 7/0617* (2013.01); *H04L 25/0228* (2013.01); *H04L 25/021* (2013.01)
(58) Field of Classification Search
  CPC .. H04B 7/0617; H04B 7/0413; H04L 25/0228
  See application file for complete search history.

(56) References Cited

U.S. PATENT DOCUMENTS

| | | |
|---|---|---|
| 9,209,873 B1 | 12/2015 | Zhang et al. |
| 2006/0274691 A1 | 12/2006 | Naguib et al. |
| 2007/0030914 A1 | 2/2007 | Ding et al. |
| 2007/0249296 A1 | 10/2007 | Howard et al. |
| 2009/0180404 A1 | 7/2009 | Jung et al. |
| 2012/0288021 A1 | 11/2012 | Park et al. |
| 2016/0234042 A9 | 8/2016 | De Victoria |
| 2016/0285525 A1 | 9/2016 | Budianu et al. |
| 2017/0214429 A1 | 7/2017 | Eistein et al. |
| 2018/0270038 A1 | 9/2018 | Oteri et al. |

OTHER PUBLICATIONS

"Amendment 4: Enhancements for Very High Throughput for Operation in Bands below 6 GHz", IEEE Std 802.11ac-2013, 2012, 425 pages.
"Amendment 5: Enhancements for Higher Throughput", 2007, 536.
Bellalta, "IEEE 802.11ax: High-Efficiency WLANs", Accepted for publication in IEEE Wireless Communications Magazine. Jul. 2015, Jul. 2015, 16 pages.

(Continued)

*Primary Examiner* — Kevin C. Harper

(57) ABSTRACT

The present disclosure describes methods and apparatuses for singular value decomposition with norm sorting. In some aspects, a sounding frame is received through a channel of a wireless medium. Based on the sounding frame, a channel covariance matrix describing conditions of the channel can be determined. The channel covariance matrix is then decomposed, with an ortho-normal matrix, to provide an intermediate matrix of vectors. One or more vectors of the intermediate matrix are sorted based on a respective norm to provide a norm-sorted matrix of the vectors. A steering matrix for the channel is then generated by ortho-normalizing at least two vectors of the norm-sorted matrix. By so doing, a steering matrix can be generated quickly and efficiently for use in subsequent communication operations.

20 Claims, 9 Drawing Sheets

(56) References Cited

OTHER PUBLICATIONS

Mu, et al., "Utility U.S. Appl. No. 15/849,213, filed Dec. 20, 2017", 46 pages.
"Notice of Allowance", U.S. Appl. No. 15/849,213, dated Apr. 10, 2019, 6 pages.
"Pre-Interview Communication", U.S. Appl. No. 15/672,117, dated Nov. 15, 2019, 3 pages.
"Pre-Interview Communication", U.S. Appl. No. 15/849,213, dated Feb. 6, 2019, 3 pages.
"Notice of Allowance", U.S. Appl. No. 15/672,117, dated May 2, 2019, 7 pages.

METHODS AND APPARATUS FOR SINGULAR VALUE DECOMPOSITION WITH NORM SORTING

RELATED APPLICATIONS

This present disclosure claims priority to U.S. Provisional Patent Application Ser. No. 62/344,615 filed Jun. 2, 2016, the disclosure of which is incorporated by reference herein in its entirety.

BACKGROUND

Many computing and electronic devices access the Internet or other resources through wireless networks, which are typically provided and administered by an access point or base station. As data consumption levels of device users increase, device manufacturers and network architects continue to develop new generations of networking equipment and communication schemes capable of supporting higher levels of data consumption. For example, some devices and access points can communicate large amounts of data by using a multiple-input multiple-output (MIMO) scheme in which data is communicated via multiple transmit and multiple receive antennas.

These advanced communication schemes, however, often require additional hardware and use more computational resources to process, encode, and communicate multiple streams of data. Aside from monetary costs associated with the additional hardware, the load on computational resources of a device can also increase heat generation and power consumption. For a mobile device with limited form factor and battery capacity, these increases can result in thermal issues, reduced performance, or shorter device runtimes.

SUMMARY

This summary is provided to introduce subject matter that is further described in the Detailed Description and Drawings. Accordingly, this Summary should not be considered to describe essential features nor used to limit the scope of the claimed subject matter.

In some aspects, a method is described that receives, via a channel, a sounding frame from a remote device. Based on the sounding frame, a channel covariance matrix that describes conditions of the channel is determined. The channel covariance matrix is then decomposed with an ortho-normal matrix to provide an intermediate matrix of vectors. Based on respective norms of the vectors, the method sorts a vector of the intermediate matrix to provide a norm-sorted matrix of the vectors. At least two of the vectors of the norm-sorted matrix are then ortho-normalized to generate a steering matrix for the channel.

In other aspects, an apparatus for wireless communication is described that includes a receiver to receive data via a wireless medium, a transmitter to transmit other data via the wireless medium, and a steering matrix generator. The steering matrix generator is configured to receive, via the receiver and through a channel of the wireless medium, a sounding frame transmitted by a remote device. Based the sounding frame, the steering matrix generator determines a channel covariance matrix that describes conditions of the channel. The channel covariance matrix is multiplied with an ortho-normal matrix to compute an intermediate matrix of vectors having respective norm values. Based on the respective norm values of the vectors, the steering matrix generators sorts one or more vectors of the intermediate matrix to provide a norm-sorted matrix of the vectors. At least two of the vectors of the norm-sorted matrix are ortho-normalized to generate a steering matrix for the channel, which can be transmitted to the remote device to facilitate subsequent wireless communication.

In yet other aspects, a System-on-Chip (SoC) is described that includes an interface for a wireless receiver, a hardware-based processor, and a memory storing processor-executable instructions for implementing a steering matrix generator. When implemented, the steering matrix generator receives, from a remote device, a sounding frame through a channel of a wireless medium. Based the sounding frame, a channel covariance matrix that describes conditions of the channel is determined. The steering matrix generator then decomposes the channel covariance matrix with an ortho-normal matrix to provide an intermediate matrix of vectors. A vector of the intermediate matrix is sorted based on a respective norm to provide a norm-sorted matrix of the vectors. A steering matrix for the channel of the wireless medium is then generated by ortho-normalizing at least two of the vectors of the norm-sorted matrix.

The details of one or more implementations are set forth in the accompanying drawings and the following description. Other features and advantages will be apparent from the description and drawings, and from the claims.

BRIEF DESCRIPTION OF THE DRAWINGS

The details of one or more implementations of singular value decomposition with norm sorting are set forth in the accompanying figures and the detailed description below. In the figures, the left-most digit of a reference number identifies the figure in which the reference number first appears. The use of the same reference numbers in different instances in the description and the figures indicates like elements.

DETAILED DESCRIPTION

Figure 1:
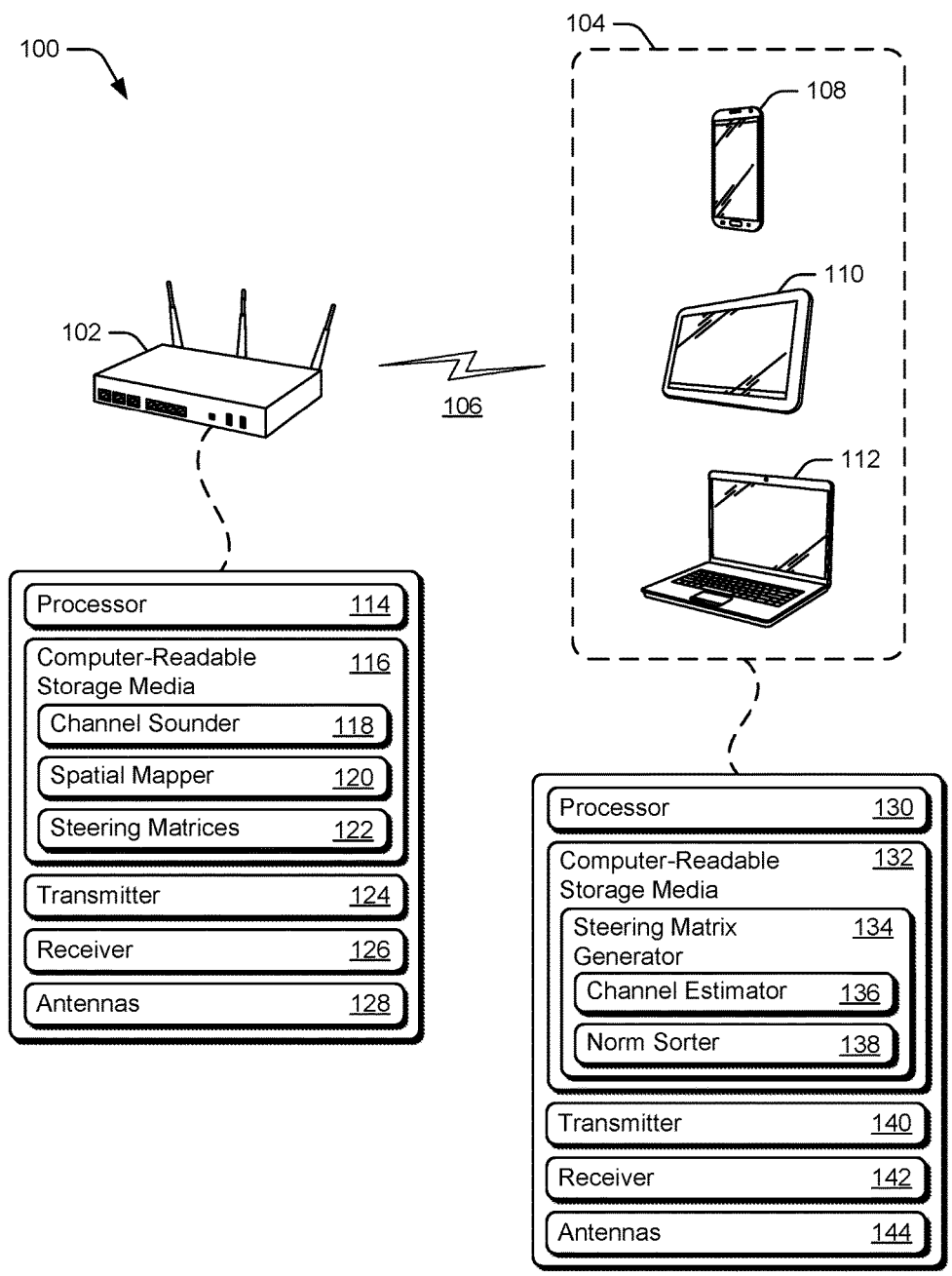
FIG. 1 illustrates an example operating environment having devices that are capable of wireless communication.

Conventional techniques for beamforming data transmissions often rely on computationally expensive and complex processes for generating steering matrices. For example, some techniques use vector subspace removal to realize orthogonality between vectors of an intermediate matrix or steering matrix. Such vector operations typically involve the multiplication of entire matrices (e.g., N×N matrices), which consumes time and large amounts of computational resources to resolve. This can be particularly problematic for mobile devices, which often have reduced processing resources and limited battery capacity by which to sustain these computationally intensive processes.

This disclosure describes techniques and apparatuses for singular value decomposition with norm sorting. In some aspects, a sounding frame is received through a channel of a wireless medium. Based on the sounding frame, a channel covariance matrix describing conditions of the channel can be determined. This channel covariance matrix is then multiplied with an ortho-normal matrix to provide an intermediate matrix of vectors. The vectors of the intermediate matrix are sorted based on respective norms to provide a norm-sorted matrix of the vectors. A steering matrix for the channel is then generated by ortho-normalizing at least two of the norm-sorted vectors. By so doing, a steering matrix for the channel can be generated through the use of a reduced-complexity algorithm, which can decrease computational loading and power consumption in wireless communication devices.

These and other aspects described herein may be performed to enable various beamforming operations in which transmissions of a device are "steered" toward a receiving device—e.g., though explicit beamforming or implicit beamforming. Explicit beamforming generally requires the downstream channel to be measured at the receiver, or beamformee, and relayed back to the transmitter, or beamformer. In an implicit beamforming implementation, the upstream wireless channel is measured by the beamformer, and the measurement is used to derive the parameters for subsequent downstream beamformed transmission. For example, to implement explicit beamforming, a beamformer (e.g., access point) can transmit sounding frames to a beamformee (e.g., smart-phone) through a channel of a wireless medium. Based on the sounding frames, the beamformee determines a channel matrix (or channel covariance matrix) describing conditions or a state of the channel. The beamformee may then implement aspects of singular value decomposition with norm sorting to generate a steering matrix, which is transmitted to the beamformer. With the steering matrix, the beamformer can pre-code multiple data streams such that the transmitted data streams are directed toward and reach the beamformee with maximum signal strength. Such techniques for generating a steering matrix can also be implemented in an implicit beamforming scheme. Further, although described with reference to wireless communication systems or devices, the aspects described herein may also be applied to other applications, such as signal processing or pattern matching, in which singular/Eigen vector calculation processes can be improved by reducing computational or algorithmic complexity.

The following discussion describes an operating environment, techniques that may be employed in the operating environment, and a System-on-Chip (SoC) in which components of the operating environment can be embodied. In the context of the present disclosure, reference is made to the operating environment by way of example only.

Operating Environment

FIG. 1 illustrates an example of an operating environment 100 having a host device 102 and client devices 104 that are capable of communicating data, packets, and/or frames over a wireless connection 106, such as a wireless-local-area network (WLAN). The WLAN may operate in accordance with various Institute of Electronics and Electrical Engineers (IEEE) 802.11 standards that may include 802.11n, 802.11ac, 802.11ad, 802.11ax, and the like. Alternately or additionally, the wireless connection 106 or other wireless connections of the devices may be implemented as a personal area network (PAN), peer-to-peer network, mesh network, or cellular network, such as a 3rd Generation Partnership Project Long-Term Evolution (3GPP LTE) network.

In this example, the host device 102 is embodied as an access point that is capable of providing and managing a wireless network that includes the wireless connection 106. In other cases, the host device 102 may include or be embodied as a base station, wireless router, broadband router, modem device, or other network administration device. The client devices 104 of the example environment 100 include a smart-phone 108, tablet computer 110, and laptop computer 112. Although not shown, other configurations of the client devices 104 are also contemplated, such as a desktop computer, a server, wearable smart-device, television, mobile-internet device (MID), a network-attached-storage (NAS) drive, mobile gaming console, and so on.

Generally, the host device 102 provides connectivity to the Internet, other networks, or networked-resources through a backhaul link (not shown), which may be either wired or wireless (e.g., a TI line, fiber optic link, intranet, a wireless-wide-area network). The backhaul link may include or connect with data networks operated by an internet service provider, such as a digital subscriber line or broadband cable and may interface with the host device 102 via an appropriately configured modem (not shown). While associated with the host device 102 via the wireless connection 106, the smart-phone 108, tablet computer 110, or laptop computer 112 may access the Internet or other networks for which host device 102 acts as a gateway.

The host device 102 includes a processor 114 configured to execute processor-executable instructions and computer-readable storage media 116 (CRM 116). In some cases, the processor 114 is implemented as an application processor or baseband processor to manage operation and connectivity of the host device 102. The CRM 116 of the host device 102 may include any suitable type and/or combination of storage media, such as read-only memory (ROM), random access memory (RAM), or Flash memory. The CRM 116 may store firmware, an operating system, or applications of the host device 102 as instructions that are executed by the processor 114 to implement various functionalities of the host device 102. In this example, a channel sounder 118, spatial mapper 120, and steering matrices 122 of the host device 102 are embodied on the CRM 116.

The channel sounder 118, spatial mapper 120, and steering matrices 122 of the host device 102 may be implemented to perform various functions associated with wireless communication. In some cases, the channel sounder 118 constructs and transmits channel sounding packets or frames to other wireless devices. The spatial mapper 120 may separate data of the host device 102 into one or more spatial streams prior to transmission. The steering matrices 122, which may be generated based on the sounding packets or frames, can be used to beamform spatial streams of data to the client devices 104. The implementations and uses of these entities vary, and are described throughout the disclosure.

The host device 102 also includes a transmitter 124, receiver 126, and antennas 128 for providing a wireless network, communicating with the client devices 104, or communicating other wirelessly-enabled devices. The transmitter 124 or receiver 126 may include any suitable number of respective communication paths (e.g., transmit or receive chains) to support transmission or reception of multiple spatial streams of data. Although not shown, radio frequency (RF) front-end circuitry of the host device 102 can couple or connect the transmitter 124 or receiver 126 to the antennas 128 to facilitate various types of wireless communication. The antennas 128 of the host device 102 may include an array of multiple antennas that are configured similar to or differently from each other.

Each of client devices 104 respectively includes a processor 130 and computer-readable storage media 132 (CRM 132). The processor 130 can be any suitable type of processor, either single-core or multi-core, for executing instructions or code associated with applications and/or an operating system of the client device 104. The CRM 132 may include any type and/or combination of suitable storage media, such as RAM, non-volatile RAM (NVRAM), ROM, or Flash memory useful to store data of applications and/or an operating system of the client device 104. In this example, a steering matrix generator 134, channel estimator 136, and norm sorter 138 of the client device 104 are also embodied on the CRM 132. Generally, the steering matrix generator 134 may use the channel estimator 136 or the norm sorter 138 to provide or calculate steering matrices to facilitate beamforming operations. The implementations and uses of these entities varies, and is described throughout the disclosure.

The client devices 104 also include a transmitter 140, receiver 142, and antennas 144 for communicating with the host device 102 or other wirelessly-enabled devices. Although shown as separate entities, the transmitter 140 and receiver 142 may be implemented in combination as a transceiver component that supports both transmit and receive functionalities. The transmitter 140 or receiver 142 may include any suitable number of respective communication paths (e.g., transmit or receive chains) to support transmission or reception of multiple spatial streams of data. Front-end circuitry (not shown) of the client device 104 may couple or connect the transmitter 140 or receiver 142 to the antennas 144 to facilitate various types of wireless communication. The antennas 144 may include an array of multiple antennas that are configured similar to or differently from each other.

Figure 2:
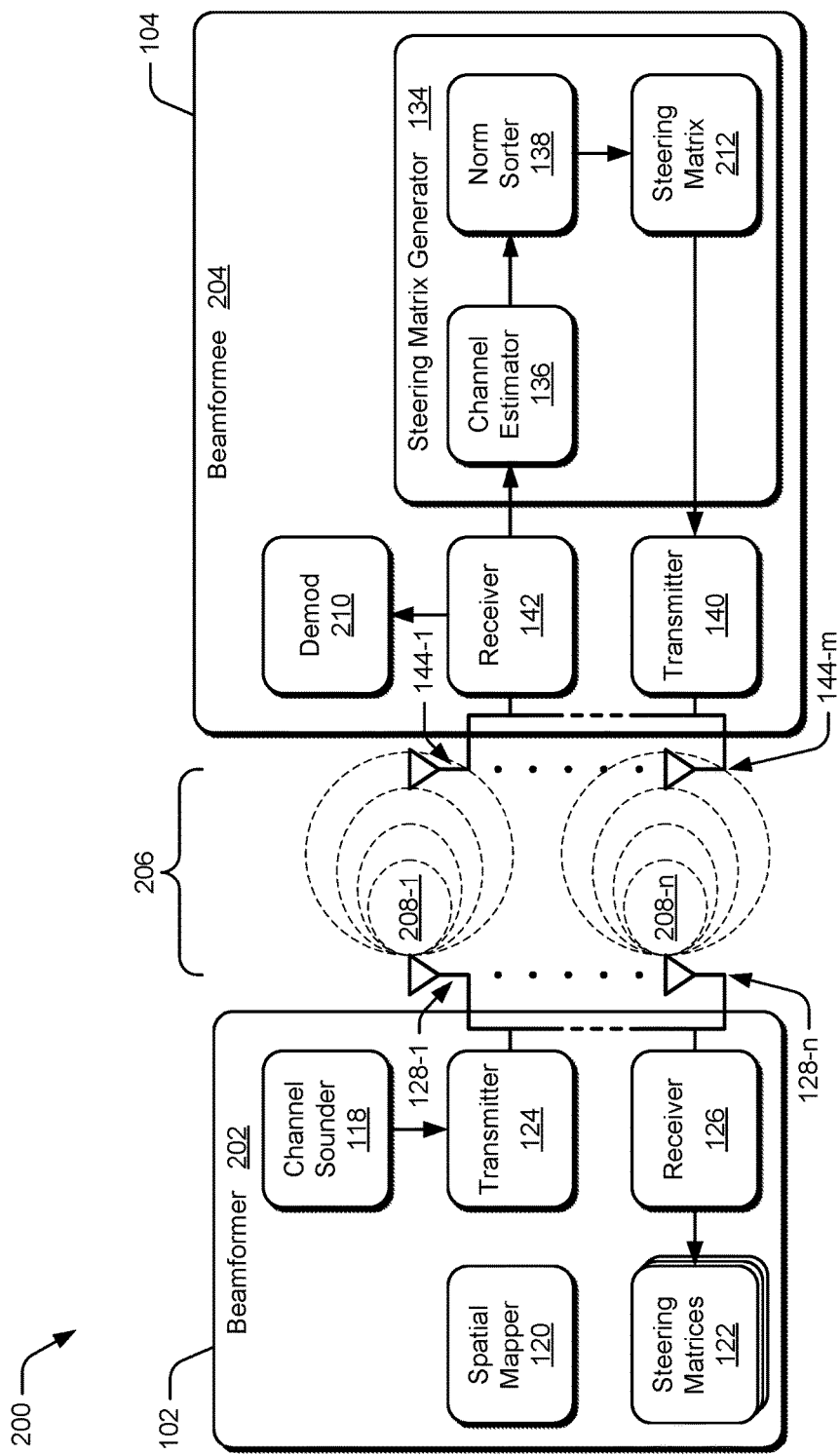
FIG. 2 illustrates example configurations of the devices of FIG. 1 that include a beamformer and beamformee in accordance with one or more aspects.

FIG. 2 illustrates example configurations of a host device 102 and client device 104 in accordance with one or more aspects generally at 200. In this example, the host device 102 and client device 104 are configured as a beamformer 202 and beamformee 204, respectively. Additionally, although described with reference to explicit beamforming in which components of a beamformee 204 are embodied on a client device 104, aspects described herein may also be implemented to support implicit beamforming. When implemented to support implicit beamforming, some components of the beamformee 204 may be embodied on a host device 102 (e.g., access point). Alternately or additionally, components of a beamformer 202 may also be embodied on a client device 104, such as to support channel sounding operations.

The beamformer 202 and the beamformee 204 communicate via channel 206 of a wireless medium, such as air, the atmosphere, or other media through which electromagnetic (EM) waves propagate. A channel 206 between the beamformer 202 and the beamformee 204 may be characterized by information that describes conditions or a state of the channel. In some cases, this channel state information (CSI) is useful to adjust or refine transmission parameters of signals transmitted through the channel 206 to a receiving device. To determine the conditions or state of the channel 206, the beamformer 202 and beamformee 204 may work together to implement channel sounding operations by which the channel 206 is characterized (e.g., measured) prior to the transmission of data.

As part of characterizing the channel 206, a channel sounder 118 of the beamformer 202 may construct sounding frames 208, such as null data packet (NDP) frames, for transmission by the transmitter 124. In some cases, the channel sounder 118 constructs a number of sounding frames 208-1 through 208-$n$ that correspond to a number of antennas 128-1 through 128-$n$ of the beamformer 202 or transmitting device. The channel sounder 118 may also construct announcement frames, such as NDP announcement frame, that identifies an intended recipient device for channel sounding operations or a format of the sounding frames to follow. For example, a NDP announcement frame may specify feedback dimensions for a target device, a type of feedback requested, and the like. Potential beamformees 204 within range of the NDP announcement frame my respond with acknowledgement or defer channel access while other devices participate in the channel sounding operations.

As shown in FIG. 2, the channel sounder 118 can transmit, via the transmitter 124, the sounding frames 208-1 through 208-$n$. In some cases, each of the sounding frames 208-1 through 208-$n$ is transmitted by a respective one of the antennas 128-1 through 128-$n$ into the channel 206 and to the beamformee 204. Across the channel 206 of the wireless medium, the beamformee 204 receives one or more of the sounding frames 208-1 through 208-$n$ that have been affected by conditions of the channel 206, such as distance, fading, multipath reflections, and the like. In some cases, the receiver 142 receives or detects each of the sounding frames 208-1 through 208-$n$ at the antennas 144-1 through 144-$m$ of the beamformee 204. Thus, the beamformee 204 can obtain channel information (e.g., channel response) about respective signal paths between each antenna 128 that transmits (e.g., transmit antenna) a sounding frame 208 and each of the antennas 144-1 through 144-$m$ at which the sounding frame is received (e.g., receive antenna).

Generally, frames or packets received by the receiver 142 can be sent to a demodulator 210 for demodulation and decoding, or to the steering matrix generator 134. During channel sounding, the channel estimator 136 of the beamformee 204 can analyze the received sounding frames 208 to build a model of conditions or state of the channel 206. For example, the channel estimator 136 can analyze long training fields (LTFs) of the sounding frames 208 to provide state information for the channel 206. As noted, sounding frames 208 transmitted by each antenna 128-1 through 128-$n$ may be received by some or all of the antennas 144-1 through 144-$m$ of the beamformee 204. Accordingly, the channel estimator 136 may construct an M~N matrix of channel state information for the channel 206, which may be referred to channel matrix H.

In some aspects, the steering matrix generator 134 decomposes the channel matrix H into other matrix or vector formats for subsequent processing and steering matrix calculations. For example, the steering matrix generator 134 can decompose the channel matrix H into a matrix of singular vectors or Eigenvectors. An eigenvector is vector that when operated on by a given operator gives a scalar multiple of itself. During various matrix calculations or manipulations, the norm sorter 138 may also sort one or more norms associated with the singular-vectors to provide a revised order by which the eigenvectors can be arranged in a given matrix. The implementations and uses of the steering matrix generator 134 and/or norm sorter 138 vary, and are described throughout the disclosure.

After the steering matrix generator 134 determines the steering matrix 212 (e.g., steering matrix 6), the steering matrix 212 can be sent via the transmitter 140 to the beamformer 202. Although referred to as a steering matrix, the beamformee 204 may also generate a feedback matrix of CSI, which may be a compressed matrix useful to the beamformer 202 in generating a more-complete steering matrix locally. Once received, the beamformer 202 may store the steering matrix 212 (or feedback matrix) with other received or determined steering matrices 122. The steering matrix 212, or others of the steering matrices 122, can then be accessed by the beamformer 202 for use in transmissions through the channel 206.

Figure 3:
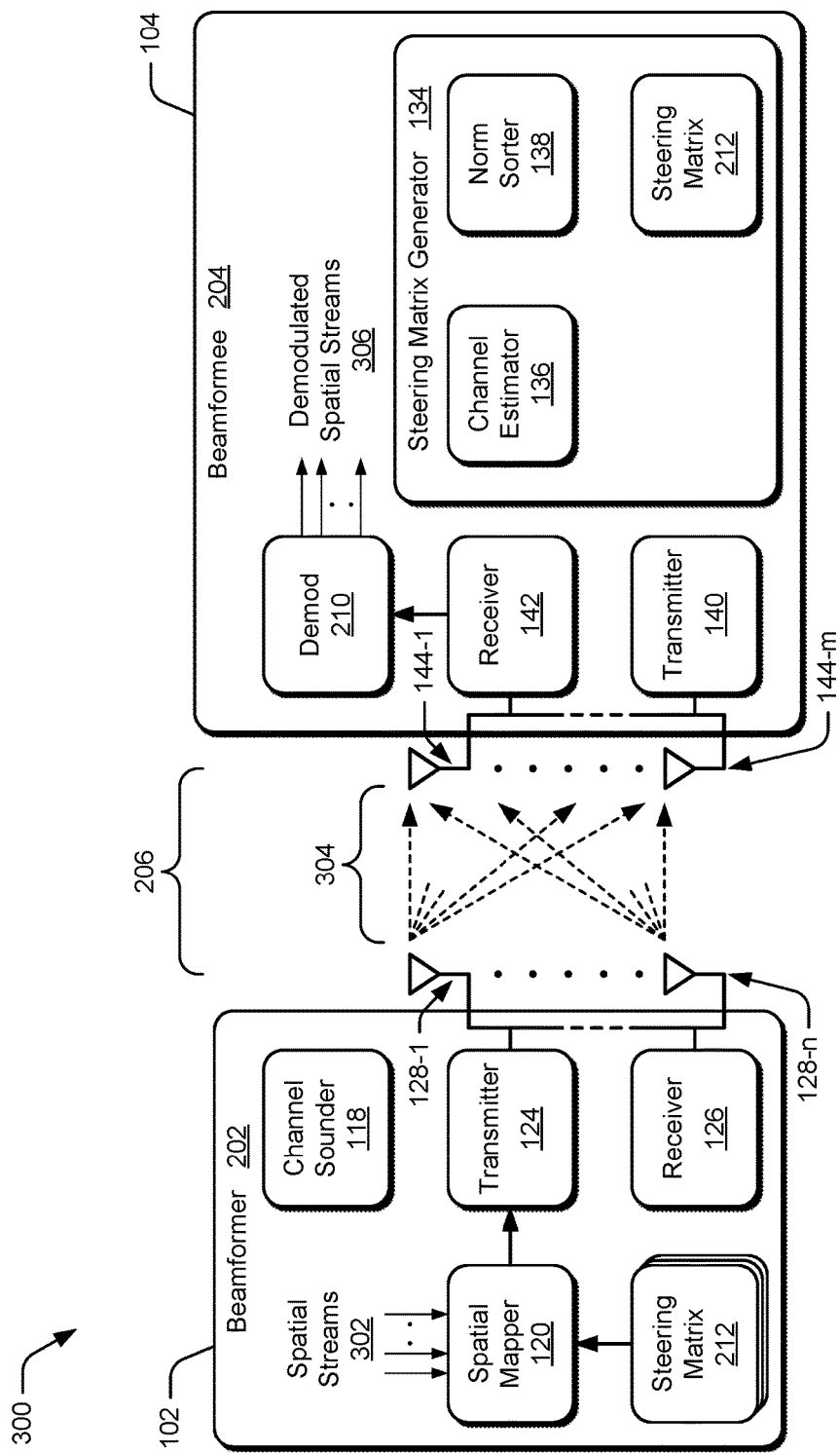
FIG. 3 illustrates other example configurations of the devices of FIG. 1 that include a beamformer and beamformee in accordance with one or more aspects.

By way of example, consider FIG. 3 which illustrates the beamformer 202 using a steering matrix to implement transmit beamforming (TxBF) operations. Here, the beamformer 202 uses the steering matrix 212 to transmit spatial streams of data 302 (spatial streams 302) to the beamformee 204. To do so, the spatial mapper 120 may use the steering matrix 212 to pre-code the spatial streams 302 for transmission via the antennas 128-1 through 128-n. Unlike other types of transmissions, such as non-beamformed multiple-input multiple-output (MIMO) that may transmit one spatial stream per antenna, the pre-coded spatial streams 302 are transmitted on multiple antennas (e.g., an antenna array). Based on the steering matrix 212, the spatial streams 302 can be pre-coded to the antennas such that phase offsets between the transmissions effectively direct or "steer" the transmission of the spatial streams 302 toward the beamformee 204. Pre-coding the transmissions with the steering matrix 212 may also adapt the individual transmissions to other channel conditions to account for distance to the receiver, fading, multi-path reflections, and the like.

As shown in FIG. 3, beamformed transmissions 304 of the spatial streams 302 are transmitted via the antennas 128-1 through 128-n of the beamformer 202. Due to the spatial mapping and pre-coding implemented by the beamformer 202, the beamformed transmissions 304 can be directionally steered toward the beamformee 204. Additionally, the respective phase shifts of the beamformed transmissions 304 contribute to constructive interference such that the beamformed transmissions 304 arrive at the beamformee 204 with maximum signal strength. Thus, transmit beamforming may increase an effective range of the beamformer 202 or improve rate-over-range performance, such as by enabling the use of more data-intensive modulation and coding schemes (MCS) over extended ranges.

At the other end of the channel 206, the beamformee 204 receives the beamformed transmissions 304 via the antennas 144-1 through 144-m. The receiver 142 sends the received spatial streams to the demodulator 210 for demodulation and decoding to provide demodulated spatial streams 306 of the data for use by the beamformee 204. As noted, the example device configurations of FIGS. 2 and 3 are described in reference to explicit beamforming in which a steering matrix is generated at a client device using information that describes a state of the channel. Because the sounding frame or packet is transmitted in a same direction of the data to be transmitted, the channel information may also include or account for the respective transmit and receive paths of the beamformer and beamformee.

In other aspects, the host device 102 and client device 104 may be configured to implement implicit beamforming in which a client device 104 transmits a sounding frame (or, in other implementations, a regular data packet). In some cases, the host device 102 broadcasts or transmits a channel sounding request to client devices of a network effective to initiate channel sounding operations at the client device. Based on the sounding frame received from the client device, the host device 102 can use a steering matrix generator 134 based on channel state information indicated by the sounding frame. Because the sounding frame is transmitted in a direction opposite to that of the data transmissions to follow, the steering matrix may estimate channel conditions associated with the respective transmit and receive paths of the devices.

Techniques of Singular Value Decomposition with Norm Sorting

The following discussion describes techniques of singular value decomposition with norm sorting. These techniques can be implemented using any of the environments and entities described herein, such as the steering matrix generator 134, channel estimator 136, or norm sorter 138. These techniques include methods illustrated in FIGS. 4, 6, 7, and 8, each of which is shown as a set of operations performed by one or more entities. These methods are not necessarily limited to the orders of operations shown. Rather, any of the operations may be repeated, skipped, substituted, or re-ordered to implement various aspects described herein. Further, these methods may be used in conjunction with one another, in whole or in part, whether performed by the same entity, separate entities, or any combination thereof. In portions of the following discussion, reference will be made to operating environment 100 of FIG. 1 and entities of FIGS. 2 and 3 by way of example. Such reference is not to be taken as limiting described aspects to operating environment 100 but rather as illustrative of one of a variety of examples.

Figure 4:
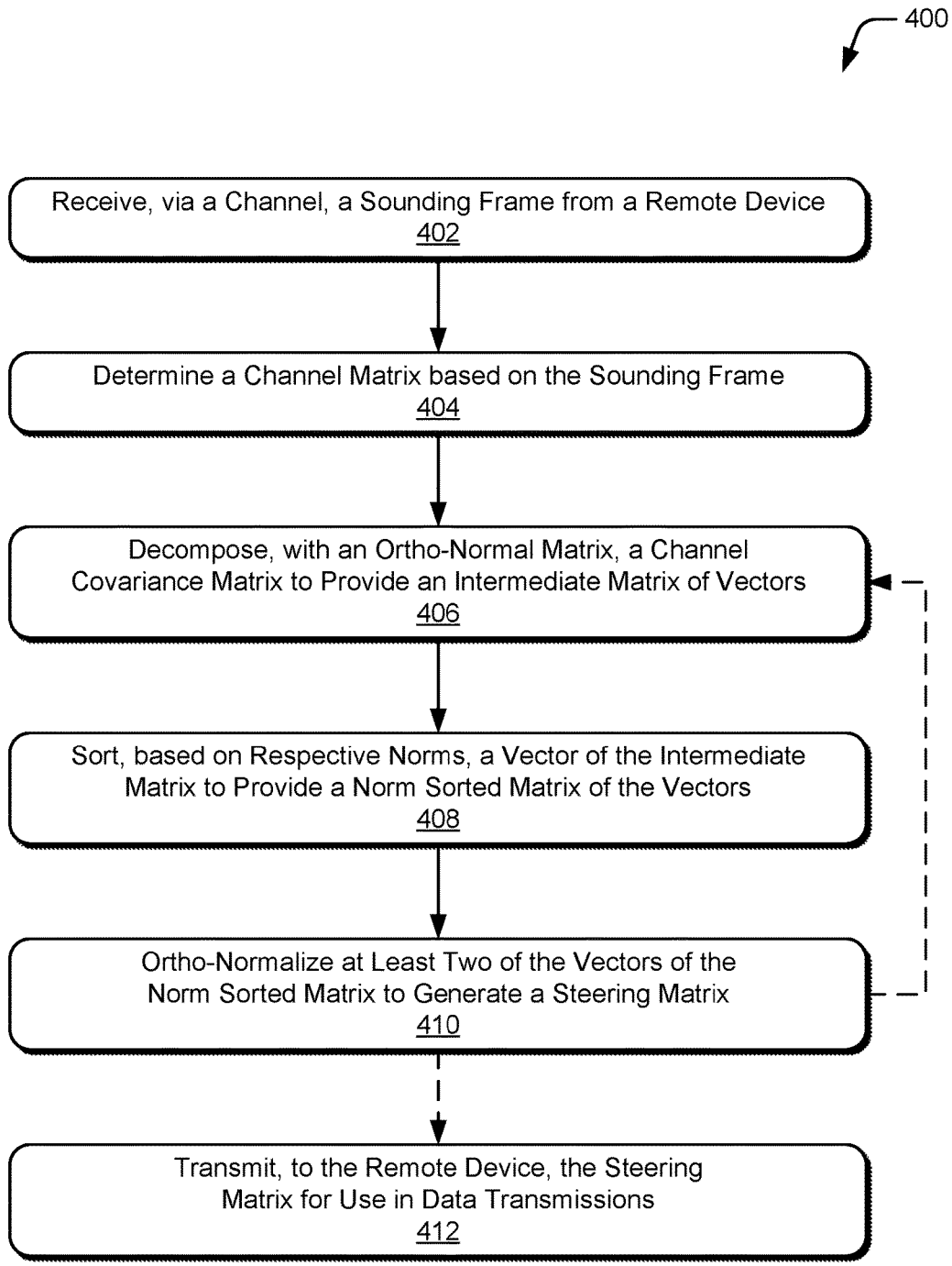
FIG. 4 depicts an example method of singular value decomposition with norm sorting for generating a steering matrix.

FIG. 4 depicts an example method 400 for generating a steering matrix through singular value decomposition with norm sorting, including operations performed by the steering matrix generator 134, channel estimator 136, or norm sorter 138.

At 402, a sounding frame is received from a remote device via a channel of a wireless medium. The sounding frame may be received at a host device or client device of a wireless network. The remote device from which the sounding frame is received can be configured as a beamformer capable of transmit beamforming via an array of antennas. In some cases, the sounding frame is received at a device configured as a beamformee having an array of antennas through which the sounding frame is received. The sounding frame may include a predefined structure, such as long training fields or pilot symbols, that can be analyzed to determine conditions within, or a state of, the channel. Alternately or additionally, the sounding frame can be received as part of a sequence of training frames transmitted from respective antennas of the remote device.

Figure 5:
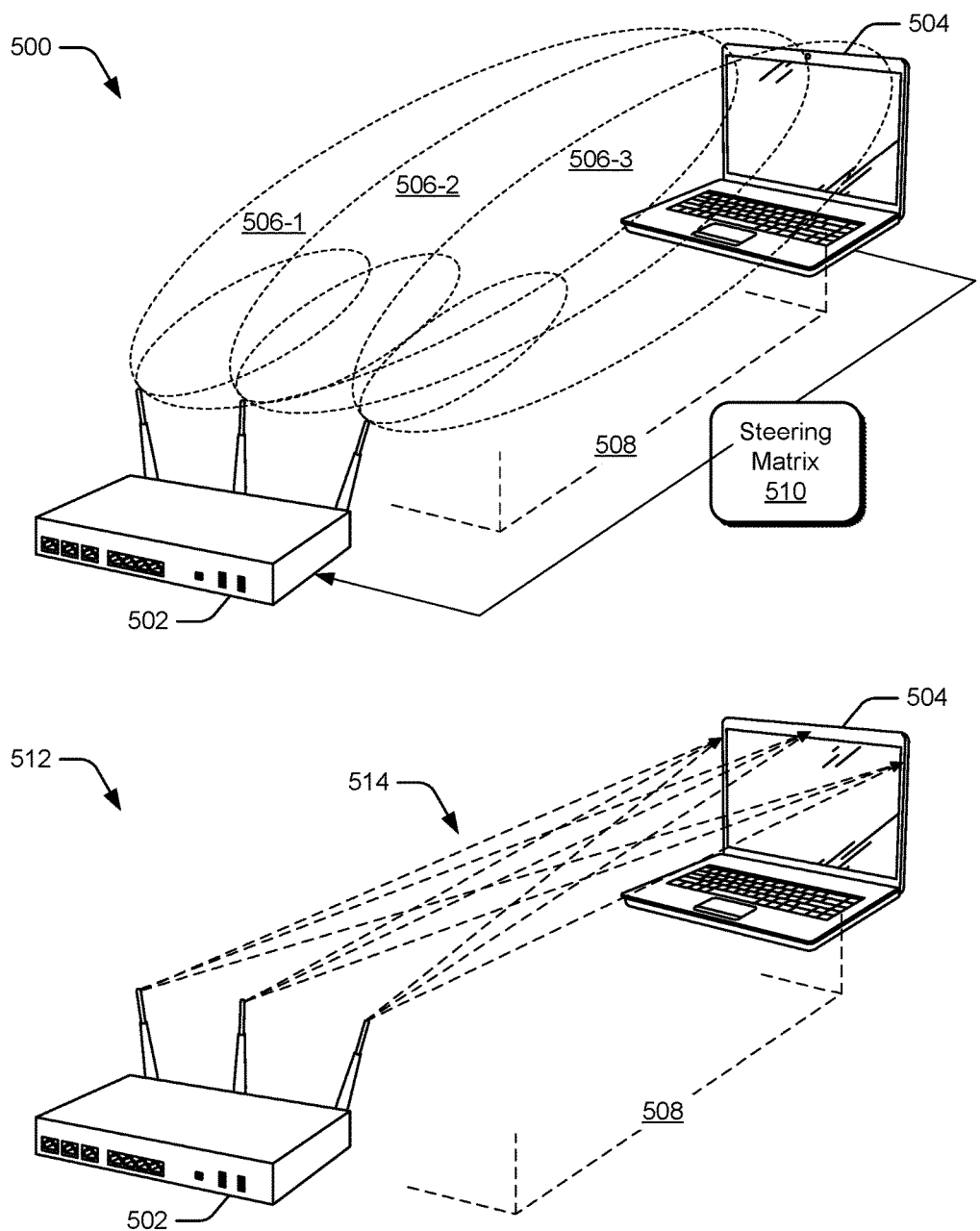
FIG. 5 illustrates an example of an access point and client device communicating in accordance with one or more aspects.

By way of example, consider FIG. 5 which illustrates an access point 502 and a laptop 504 implementing channel sounding operations at 500. Here, assume that the access point 502 is configured as a beamformer, the laptop 504 is configured as a beamformee, and that the devices a preparing to implement explicit beamforming operations. To initiate channel sounding, the access point 502 can broadcast an NDP announcement frame (not shown) that identifies the laptop 504 as an intended beamformee. After receiving an optional acknowledgment from the laptop 504, the access point 502 transmits a series of sounding frames 506-1 through 506-3 (e.g., NDP frames) from an array of N transmit antennas of the access point 502 to the laptop 504. These sounding frames 506-1 through 506-3 travel through a channel 508 of a wireless medium and are received at the laptop 504 via an array of M receive antennas (not shown).

At 404, a channel matrix is determined based on the sounding frame. The channel matrix may describe conditions or a state of the channel between the remote entity and the device at which the sounding frame is received. For example, the channel matrix may describe multiple signal paths between a transmitter from which the sounding frame was transmitted and a receiver at which the sounding frame is received. In some cases, the channel matrix is determined by analyzing training fields of the sounding frame to generate channel state information. Continuing the ongoing example shown in FIG. 5, a channel estimator 136 of the laptop 504 analyzes training fields of the sounding frames 506-1 through 506-3 to determine channel response (e.g., channel state information) of the channel 508. From this channel response, the channel estimator 136 generates a channel matrix H for an mm subcarrier in an orthogonal frequency-division multiplexing (OFDM) system as shown by equation 1.

$$H(m) = \begin{bmatrix} h_{1,1}(m) & \ldots & h_{1,N}(m) \\ \vdots & \ddots & \vdots \\ h_{M,1}(m) & \ldots & h_{M,N}(m) \end{bmatrix}$$

At 406, a channel covariance matrix is decomposed with an ortho-normal matrix to provide an intermediate matrix of vectors. This decomposition of the channel covariance may include multiplying the channel covariance matrix with the ortho-normal matrix. Additionally, operation 406 may include selecting or generating the ortho-normal matrix as an initialization matrix for the matrix decomposition. In some cases, the decomposition is implemented in whole or part as an Eigen decomposition of the channel covariant matrix calculated from the channel matrix H. In the context of the present example, assume for simplicity that the channel matrix H is a square N×N matrix or that a number of transmit antennas matches a number of receive antennas. A steering matrix generator 134 of the laptop 504 can generate a channel covariance matrix B (e.g., beam matrix) through multiplying a Hermitian transform or conjugate transpose of the channel matrix H as shown in equation 2.

$$B = H^H H$$

Equation 2: Beam Matrix B of Size N×N

The steering matrix generator 134 may then select an orthogonal and normalized matrix, also referred to as an ortho-normal matrix Q as an initialization matrix for the decomposition. With the ortho-normal matrix Q, the beam matrix B can be decomposed into an intermediate matrix of vectors q and associated norms a as shown in equation 3. Note that the intermediate matrix may also be referred to as a temporary matrix or matrix of temporary vectors that may be useful to generate a steering matrix.

Ortho-Normal Matrix $Q = [q_1 \, q_2 \ldots q_N]$ Computation of Intermediate Matrix $q_i^{tmp} = B \cdot q_i$ wherein each vector $q_i^{tmp}$ has an associated norm $a_i$ for $i = 1, 2, \ldots, N$ Equation 3: Intermediate Matrix and Norms At 408, a vector of the intermediate matrix is sorted based on respective norms of the vectors. In some cases, the norms of the intermediate matrix are sorted in a descending order of magnitude. This may be effective to identify vectors of the intermediate matrix with the largest norms or norm values. Alternately, the norms may be sorted in an ascending order of magnitude depending on sorting criteria or processing order of the norms. A number of the norms sorted may correlate to a number of spatial streams of data to be transmitted by the beamformer. For example, when preparing to transmit three spatial streams, the norms of the intermediate matrix may be sorted to identify the three largest norm values. Based on the norm values, one or more of the vectors of the intermediate matrix are re-ordered. This may include re-ordering the vectors of the intermediate matrix in order of descending norms or norm values. By so doing, a norm-sorted matrix of the vectors can be provided during the steering matrix generation process.

Continuing the ongoing example, a norm sorter 138 of the laptop 504 sorts respective norms associated with vectors of the intermediate matrix. Once the norms of the intermediate matrix are sorted in descending order of value or magnitude, the norm sorter re-arranges the associated vectors based on the sorted order of the norms as shown in equation 4.

Sort Norms $a_1 \, a_2 \, a_3 \ldots a_N$ of the intermediate matrix vectors $q_i^{tmp}$ such that Norms of $q_i^{tmp}$ are sorted in descending order Re-arrange $q_i^{tmp}$ based on the sorted order of the norms to provide a Norm-Sorted Matrix $G^{tmp} = [g_1^{tmp} \, g_2^{tmp} \ldots g_N^{tmp}]$ such that norms of $g_1^{tmp}$ are in descending order Equation 4: Norm-Sorted Matrix of Vectors At 410, at least two of the vectors of the norm-sorted matrix are ortho-normalized to provide a steering matrix. Generally, ortho-normalizing may comprise a process or algorithm in which a linearly independent set of vectors are orthogonalized amongst each other and normalized. In other words, the linearly independent vectors may be manipulated such that the vectors are perpendicular to each other (e.g., dot product is zero) and have a length of one (e.g., unit vector). The orthogonalization may include determining, from the set of linearly independent vectors, a set of orthogonal vectors that span a particular vector subspace (e.g., inner product space or Euclidean space $R^n$). Each vector of the orthogonal set may be orthogonal to other vectors of the set and have a linear span that corresponds that vector's span prior to orthogonalization with the other vectors. The orthogonalization process may implement any suitable type of mathematical operation to derive vectors that are orthogonal to each other, such as projection, reflection, or Givens rotation. To normalize the vectors of the orthogonal set, each vector can be scaled by an inverse of the vector's respective norm (e.g., divided by the norm), such that the resulting vectors are all unit vectors.

Ortho-normalizing the norm-sorted matrix may also be effective to provide a channel feedback matrix or other compact matrix that is suitable for a beamformer to generate the steering matrix locally. In some cases, all of the vectors of the norm-sorted matrix are ortho-normalized among each other. The vectors of the norm-sorted matrix may be ortho-normalized using any suitable process or calculation sequence, such as a Gram-Schmidt process, a Householder transformation, Givens rotations, Cholesky decomposition, and the like.

In the context of the present example, the steering matrix generator 134 of the laptop 504 ortho-normalizes the vectors of the norm-sorted matrix to generate a steering matrix 510.

In this particular example, the steering matrix generator 134 all of the vectors such that all vectors of the steering matrix 510 are ortho-normalized amongst each other as described in equation 5.

Ortho-Normalize among $g_i^{tmp}$ vectors of the norm-sorted matrix for $i=1,2,\ldots,N$ to obtain $g_i$ of a steering matrix $G$ or $G=[g_1\ g_2\ \ldots\ g_N]$ where $g_i$, $i=1,2,\ldots,N$ are ortho-normalized among each other Equation 5: Steering Matrix From operation 410, the method 400 may return to operation 406 to perform another iteration of matrix decomposition, norm sorting, and/or ortho-normalization based on previously generated vectors or proceed to operation 412. When returning to operation 406, the norm-sorted matrix generated at operation 410 may be set as the initialization matrix for decomposing the channel matrix in a next iteration. The operations of method 400, such as operations 406 through 410, may be performed any suitable number of times. Continuing the ongoing example, the steering matrix generator 134 performs K iterations in which operations 406 through 410 are repeated. At the $k^{th}$ iteration, an output G of the $(k-1)^{th}$ is set as the initialization matrix (e.g., Q=G). Performed to the $K^{th}$ iteration, the output of the method 400 may include a steering matrix as shown in equation 6.

A steering matrix $G=[g_1\ g_2\ \ldots\ g_N]$ where $g_i$, $i=1,2,\ldots,M$ are ortho-normalized among each other Equation 6: Steering Matrix after K Iterations Optionally at 412, the steering matrix is transmitted to the remote device for use in subsequent transmissions. The steering matrix may be transmitted as a full steering matrix, or a reduced or compact feedback matrix to conserve transmission overhead. Alternately, when implementing implicit beamforming, a beamformer may use the steering matrix locally to pre-code spatial streams for transmit beamforming to a receiving device.

Concluding the present example, the steering matrix generator 134 of the laptop 504 transmits the steering matrix 510 (e.g., steering matrix G) to the access point 502. A spatial mapper 120 of the access point 502 can then pre-code spatial streams of data for transmission via transmit beamforming to the laptop 504. As shown at 512, the pre-coding of the spatial streams is effective to steer the beamformed transmissions 514 to the laptop 504, which may increase received signal strength and improve a signal-to-noise ratio of the transmissions. On the other side of channel 508, the laptop 504 receives the beamformed transmissions 514, which can be demodulated and/or decoded to provide spatial streams of data for use at the laptop 504.

In some aspects, the norm-sorted steering matrix may improve the efficiency of the beamformer such that an effective steering matrix can be generated in as few as one or two iterations. By so doing, transmission performance with less than 0.5 dB degradation can be achieved versus computationally intensive estimation of perfect eigenvectors. As such, a norm-sorted steering matrix can be generated in less time and with fewer computational resources, which may improve power consumption and reduce heat generation of a beamformee or steering matrix generating device.

Figure 6:
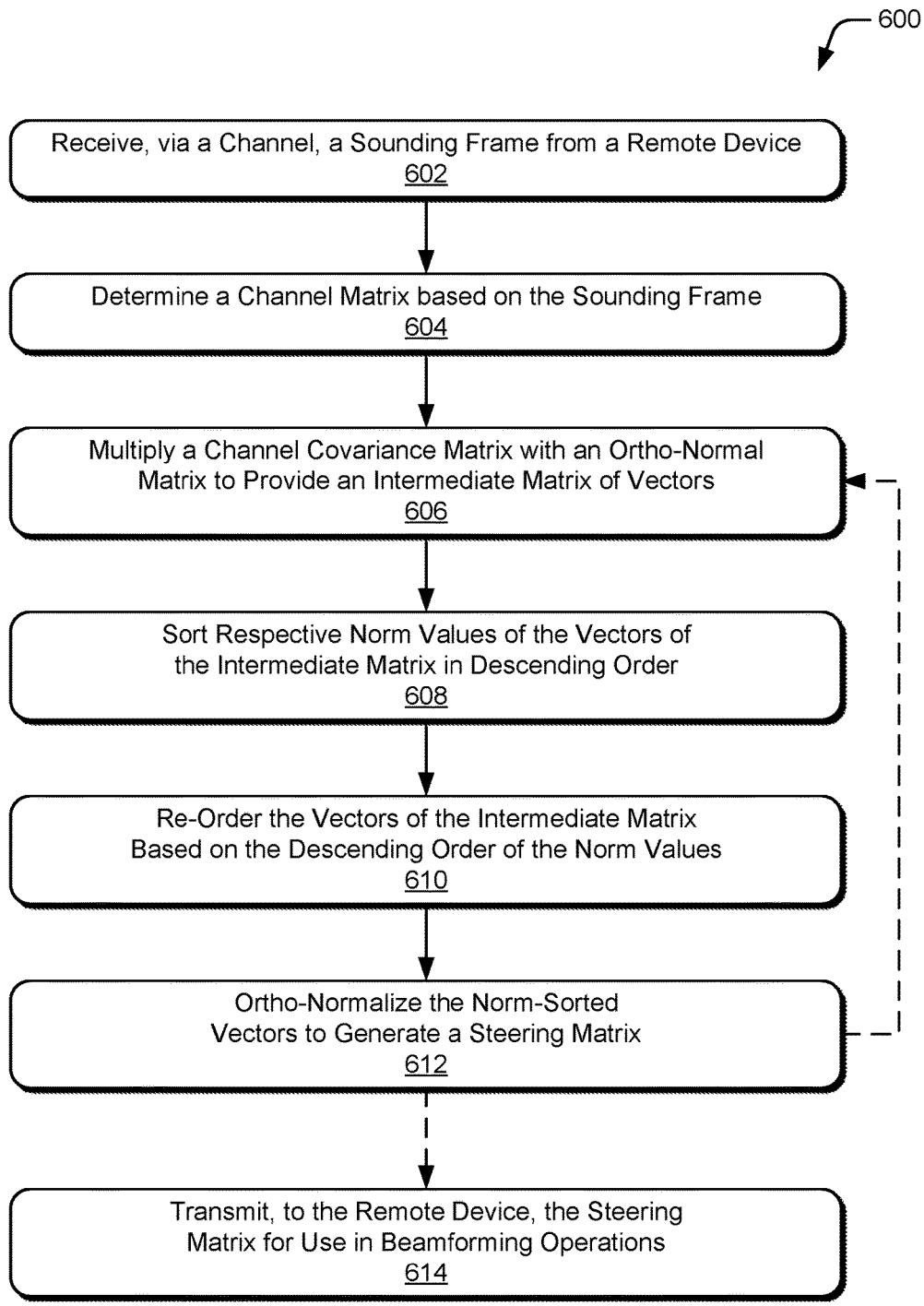
FIG. 6 depicts an example method for generating a steering matrix with ortho-normalized vectors.

FIG. 6 depicts an example method 600 for generating a steering matrix with ortho-normalized vectors, including operations performed by the steering matrix generator 134, channel estimator 136, or norm sorter 138.

At 602, a sounding frame is received through a channel of a wireless medium and from a remote device. The sounding frame may be received responsive to transmission of a request to initiate channel sounding operations.

At 604, a channel matrix is determined based on the sounding frame. Training fields or pilot symbols of the sounding frame may be analyzed to determine a state or conditions of the channel. Generally, the channel matrix may describe the state of the channel or transmit paths between the remote device and device at which the sounding frame is received. Alternately or additionally, a channel covariance matrix can be obtained from multiplying a conjugate transpose or Hermitian transpose of the channel matrix with the channel matrix.

At 606, a channel covariance matrix is multiplied with an ortho-normal matrix to provide an intermediate matrix of vectors. This may include multiplying each column of the ortho-normal matrix with the channel covariance matrix to provide the intermediate matrix of vectors. In some cases, the ortho-normal matrix is multiplied with the channel matrix. Additionally, each vector of the intermediate matrix may also be associated with a respective norm or norm value.

At 608, respective norm values of the vector of the intermediate matrix are sorted in descending order. The largest norm values may be associated with the largest respective Eigen vectors of the intermediate matrix. In some cases, the number of the norm values sorted correlates to a number of spatial streams for which a steering matrix is being generated. For example, in order to transmit three spatial streams of data or information, the respective norm values can be sorted to identify the three largest norms and the corresponding Eigen vectors. Alternately, the respective norm values can be sorted in ascending order, which effectively provides a reverse order of the descending order.

At 610, the vectors of the intermediate matrix are re-ordered based on the descending order of the norm values. The vectors of the intermediate matrix can be re-ordered such that the Eigen vectors corresponding to the largest norms are moved to the first and succeeding columns of the intermediate matrix. For example, the Eigen vectors with the three largest eigenvalues can be moved to the first (e.g., leftmost) three column of the intermediate matrix. Note that these vectors may not be ortho-normalized amongst each other.

At 612, the norm-sorted vectors are ortho-normalized to generate a steering matrix. In some cases, all of the norm-sorted vectors are ortho-normalized to generate a steering matrix or compressed channel feedback matrix. The vectors of the norm-sorted matrix may be ortho-normalized using any suitable process or calculation sequence, such as a Gram-Schmidt process, a Householder transformation, Givens rotations, Cholesky decomposition, and the like.

From operation 612, the method 600 may return to operation 606 to perform another iteration of matrix decomposition, vector re-ordering, and/or ortho-normalization based on previously generated vectors or proceed to operation 614. When returning to operation 606, the norm-sorted matrix generated at operation 612 may be set as the initialization matrix for decomposing the channel matrix in a next iteration. The operations of method 600, such as operations 606 through 612, may be performed any suitable number of times.

Optionally at 614, the steering matrix is transmitted to the remote device of use in beamforming operations. In some cases, a compressed or compact version of the steering matrix is transmitted to conserve transmitting resources or channel bandwidth. With the steering matrix, a beamformer can pre-code spatial streams of data for transmission effective to transmit, via beamforming, the spatial streams through the channel of the wireless medium. Alternately, if implementing implicit beamforming, a beamformer may use the steering matrix locally to pre-code spatial streams for beamformed transmission.

Figure 7:
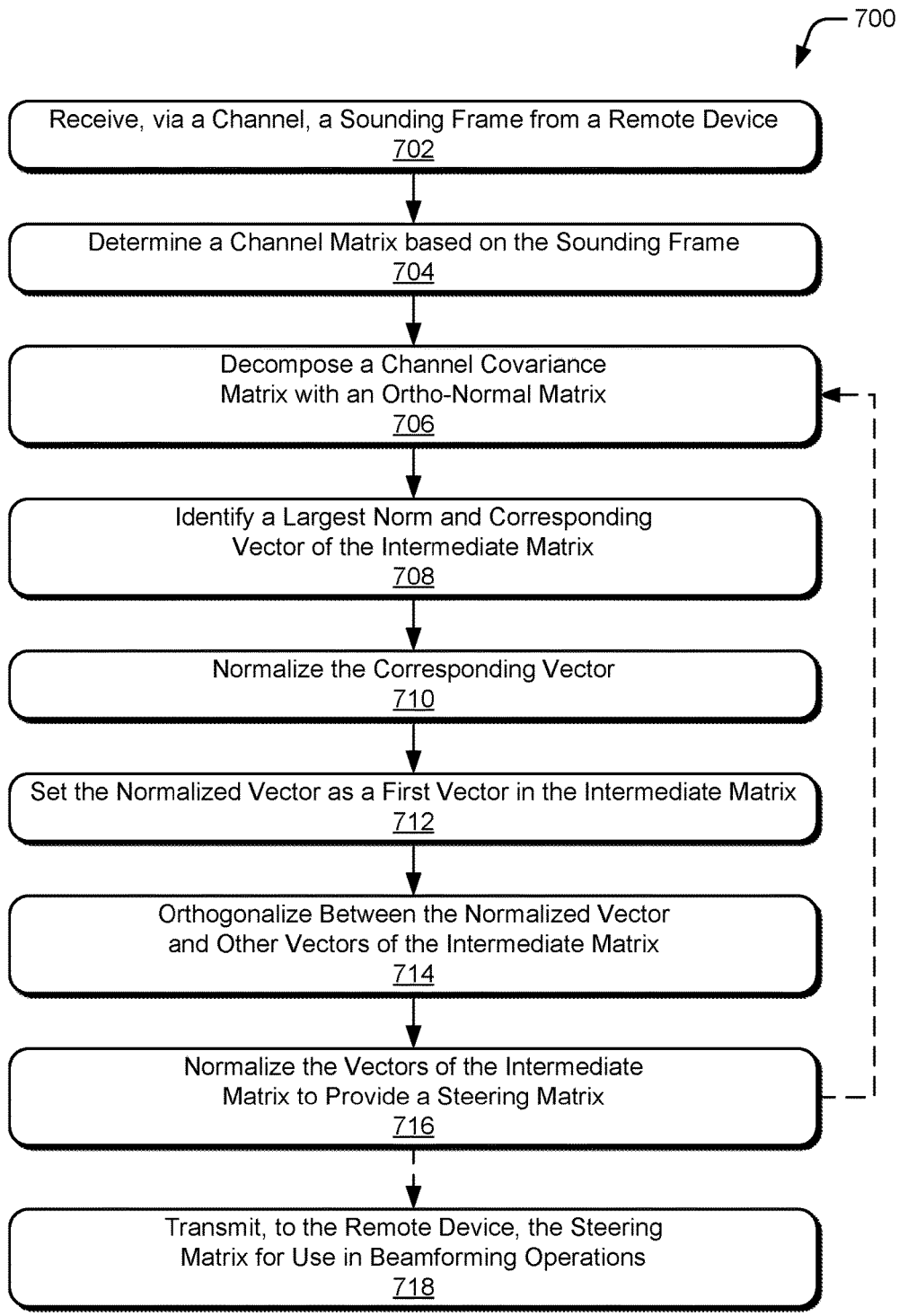
FIG. 7 depicts an example method for generating a steering matrix with ortho-normalized subsets of vectors.

FIG. 7 depicts an example method 700 for generating a steering matrix with ortho-normalized subsets of vectors including operations performed by the steering matrix generator 134, channel estimator 136, or norm sorter 138.

At 702, a sounding frame is received through a channel of a wireless medium and from a remote device. The sounding frame may be received responsive to transmission of a request to initiate channel sounding operations. In some cases, the sounding frame is received following reception of an announcement frame indicating a time (e.g., time slot) at which the sounding frame will be transmitted.

At 704, a channel matrix is determined based on the sounding frame. Training fields or pilot symbols of the sounding frame may be analyzed to determine a state or conditions of the channel. Generally, the channel matrix may describe the state of the channel or transmit paths between the remote device and device at which the sounding frame is received. Alternately or additionally, a channel covariance matrix can be obtained from multiplying a conjugate transpose or Hermitian transpose of the channel matrix with the channel matrix.

At 706, the channel matrix is decomposed with an ortho-normal matrix to provide an intermediate matrix of vectors and associated norms. This may include multiplying the channel covariance matrix with the ortho-normal matrix. With the ortho-normal matrix Q, the beam matrix B can be decomposed into an intermediate matrix of vectors q and associated norms a as shown in equation 7.

Initialization Ortho-Normal Matrix $Q=[q_1\ q_2\ \ldots\ q_N]$
Intermediate Matrix $q_i^{tmp}=B \cdot q_i$ Norm $a_i$ for $i=1, 2, \ldots, N$ Equation 7: Intermediate Matrix and Norms At 708, a largest norm and corresponding vector of the intermediate matrix are identified. Alternately if performed during a second or greater iteration of the method 700, a second largest norm or a largest norm of a subset of vectors may be identified. In the context of the intermediate matrix, a largest norm at and associated vector $q_i^{tmp}$ can be identified.

At 710, the vector that corresponds to the largest norm is normalized. In some cases, the vector corresponds to a largest norm of a subset of norms, which may be associated with a subset of vectors. Continuing the ongoing example, $q_i^{tmp}$ is normalized.

At 712, the normalized vector is set as a first vector of the intermediate matrix. In the context of the present example, the normalized vector can be set as shown in equation 8 to provide a largest-norm-sorted matrix.

Set normalized $q_i^{tmp}$ to be $q_1^{tmp}$ Set rest of $q_i^{tmp}$ to be $g_m^{tmp}$ for $m>1$ Largest-Norm-Sorted Matrix $G^{tmp}=[g_1^{tmp}\ g_2^{tmp}\ \ldots\ g_N^{tmp}]$ Equation 8: Largest-Norm-Sorted Matrix At 714, orthogonalization between the normalized vector and other vectors of the intermediate matrix is performed. As shown in equation 9, the vectors can be orthogonalized based on the first vector of the matrix.

Orthogonalize between $g_1^{tmp}$ and $g_i^{tmp}$, $i=2,3,\ldots,N$ as $v_i^{tmp}=g_i^{tmp}-([g_1^{tmp}]^H \cdot g_i^{tmp})g_1^{tmp}$ Equation 9: Vector Orthogonalization At 716, remaining vectors of the intermediate matrix are normalized to provide a steering matrix. Here, note that while the vectors can be normalized as shown in equation 10, the vectors may not all be ortho-normal amongst each other due to limited orthogonalization performed at operation 714.

Normalize $v_i^{tmp}$ to be $g_i$ $G=[g_1\ g_2\ \ldots\ g_N]$ where $g_i$, $i=2,3,\ldots,N$ may not be ortho-normal among each other Equation 10: Steering Matrix Normalization From operation 716, the method 700 may return to operation 706 to perform another iteration of matrix decomposition, vector sorting, and/or ortho-normalization based on previously generated vectors or proceed to operation 718. At 718, the steering matrix is transmitted to the remote device for use in beamforming operations. For example, a beamformer can pre-code spatial streams of data for transmission to transmit, via beamforming, the spatial streams through the channel of the wireless medium.

When returning to operation 706 for subsequent iterations of the method, the vectors of the matrices may be organized into subsets. When starting another iteration k, the output matrix G of a previous iteration (k−1) may be used as the initialization matrix (e.g., Q=G). The matrix decomposition can then be performed as shown in equation 11.

Separate intermediate matrix $q_i^{tmp}=B \cdot q_i$ and its norms $a_i$ for $i=1,2,\ldots,N$ into subsets that include: a first subset $\{q_i^{tmp}, i<k\}$, which is ortho-normalized among vectors of the first subset to obtain $\{g_i^{tmp}, i<k\}$ second subset $\{q_i^{tmp}, i \geq k\}$, for which the largest norm $a_i$ is found among $\{a_i^{tmp}, i \geq k\}$ and associated vector $q_i^{tmp}$ Equation 11: Vector Subsets These subsets of vectors can then be ortho-normalized as shown in equation 12, which may be implemented in whole or part through operations 714 and/or 716 of the method 700.

Ortho-normalize $q_i^{tmp}$ with respect to first subset $\{q_i^{tmp}, i<k\}$ to obtain $q_k^{tmp}$ Set rest of $q_i^{tmp}$ in the second subset to $q_m^{tmp}$ for $m>k$ $G^{tmp}=[g_1^{tmp}\ g_2^{tmp}\ \ldots\ g_N^{tmp}]$ Set $g_i=g_i^{tmp}$ for $i=1,2,\ldots,k$ Orthogonalize between the set $\{g_i^{tmp}$, for $i=1,2,\ldots,k\}$, and vector $g_i^{tmp}$ with $i=k+1, k+2,\ldots,N$ as $v_i^{tmp}=g_i^{tmp}-([g_1^{tmp}]^H \cdot g_i^{tmp})g_1^{tmp}+([g_2^{tmp}]^H \cdot g_i^{tmp})g_2^{tmp}+\ldots+([g_k^{tmp}]^H \cdot g_i^{tmp})g_k^{tmp}$ Normalize $v_i^{tmp}$ to be $g_i$ $G=[g_1\ g_2\ \ldots\ g_N]$ Final iteration output first $M$ vectors as $g_i$, $i=1,2,\ldots,M$ Equation 12: Ortho-Normalizing at a $k^{th}$ Iteration Compared to other methods, this method 700 may reduce computational complexity by orthogonalizing subsets of vectors. In some cases, such as when multiple iterations of matrix generation are performed, the method 700 may be more efficient.

Figure 8:
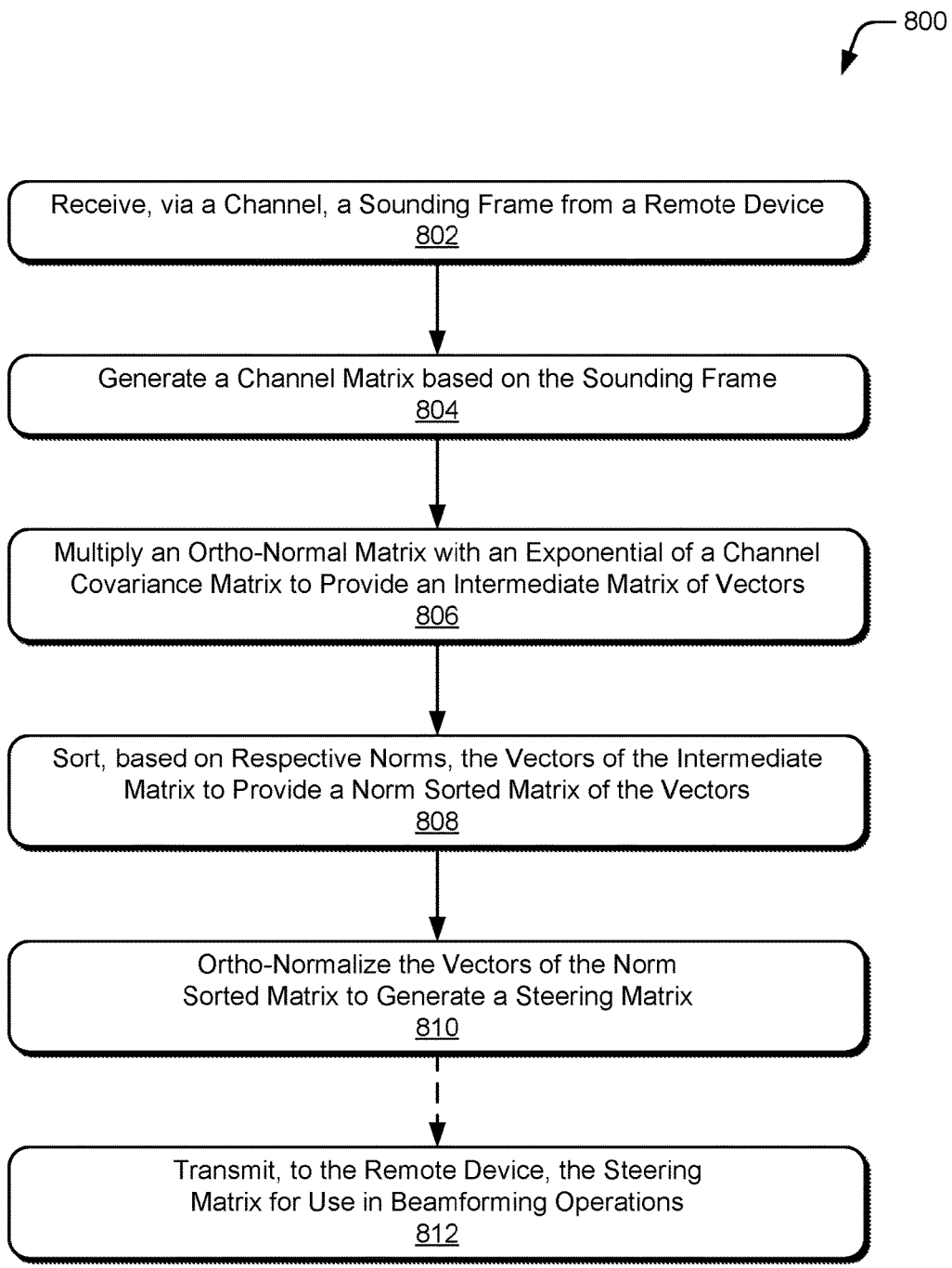
FIG. 8 depicts an example method for generating a steering matrix with an exponential channel matrix.

FIG. 8 depicts an example method 800 for generating a steering matrix with an exponential channel matrix including operations performed by the steering matrix generator 134, channel estimator 136, or norm sorter 138.

At 802, a sounding frame is received through a channel of a wireless medium and from a remote device. The sounding frame may be received responsive to transmission of a request to initiate channel sounding operations. In some cases, the sounding frame includes predefined training fields that are configured to enable analysis of the channel of the wireless medium.

At 804, a channel matrix is generated based on the sounding frame. The sounding frame may be analyzed to determine a state or conditions of the channel. Vectors and respective norms of the channel matrix can be used to describe this state of the channel or other channel information. In some cases, the channel matrix indicates channel response parameters between the respective antennas of the devices communicating.

At 806, an ortho-normal matrix is multiplied with an exponential of the channel matrix to provide an intermediate matrix of vectors. In some cases, doing so may be an alternative to performing multiple iterations of a method to generate a steering matrix. For example, instead of performing K iterations of multiplication, sorting, and ortho-normalizing a beam or channel covariance matrix can be raised to the $K^{th}$ power as shown in equation 13.

$$q_i^{tmp} = B^K \cdot q \text{ where } B^K = B \cdot B \ldots B$$

Equation 13: Exponential Channel Matrix

Alternately or additionally, the ortho-normal matrix is multiplied with the channel covariance matrix, which may be referred to as a beam matrix.

At 808, the vectors of the intermediate matrix are sorted based on respective norms of the vectors. In some cases, the norms of the intermediate matrix are sorted in a descending order of magnitude. This may be effective to identify vectors of the intermediate matrix with the largest norms or norm values. Alternately, the norms may be sorted in an ascending order of magnitude depending on sorting criteria or processing order of the norms. A number of the norms sorted may also correlate to a number of spatial streams of data to be transmitted by the beamformer.

At 810, the norm-sorted vectors are ortho-normalized to generate a steering matrix. The vectors of the norm-sorted matrix may be ortho-normalized using any suitable process or calculation sequence, such as a Gram-Schmidt process, a Householder transformation, Givens rotations, Cholesky decomposition, and the like.

Optionally at 812, the steering matrix is transmitted to the remote device of use in beamforming operations. With the steering matrix, a beamformer can pre-code spatial streams of data for transmission to transmit, via beamforming, the spatial streams through the channel of the wireless medium.

System-on-Chip

Figure 9:
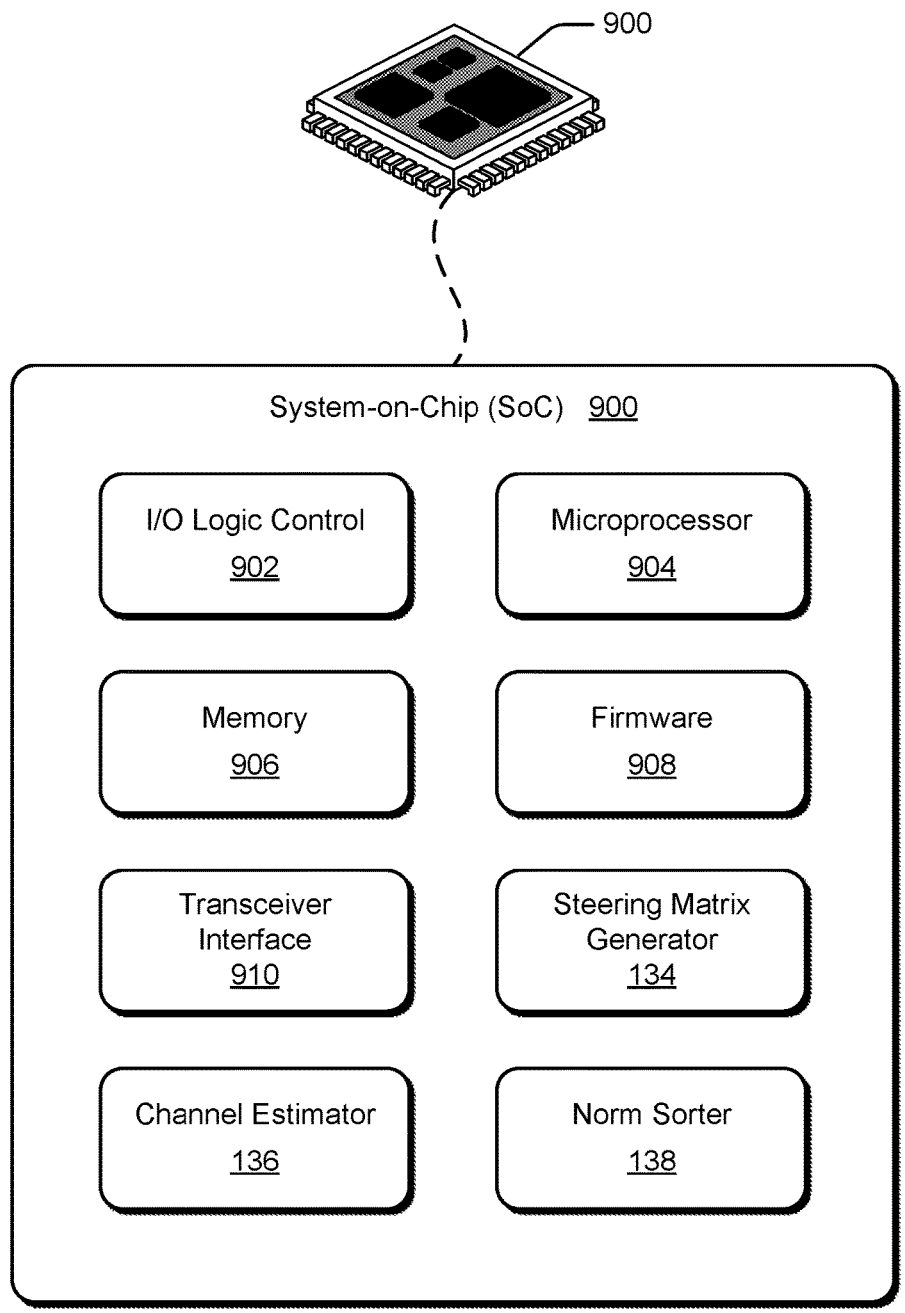
FIG. 9 illustrates an example System-on-Chip (SoC) environment for implementing aspects of singular value decomposition with norm sorting.

FIG. 9 illustrates an exemplary System-on-Chip (SoC) 900 that can implement various aspects of SVD with norm sorting. The SoC 900 can be implemented in any suitable device, such as a smart-phone, cellular phone, netbook, tablet computer, access point, wireless router, network-attached storage, camera, smart appliance, printer, a set-top box, or any other suitable type of device. Although described with reference to a SoC, the entities of FIG. 9 may also be implemented as an application-specific integrated-circuit (ASIC), chip set, communications controller, application-specific standard product (ASSP), digital signal processor (DSP), programmable SoC (PSoC), system-in-package (SiP), or field-programmable gate array (FPGA).

The SoC 900 can be integrated with electronic circuitry, a microprocessor, memory, input-output (I/O) logic control, communication interfaces, other hardware, firmware, and/or software useful to provide functionalities of a device, such as any of the devices listed herein. The SoC 900 can also include an integrated data bus (not shown) that couples the various components of the SoC for data communication between the components. The integrated data bus or other components of the SoC 900 may be exposed or accessed through an external port, such as a JTAG port. For example, components the SoC 900 may be configured or programmed (e.g., flashed) through the external port at different stages of manufacture, provisioning, or deployment.

In this example, the SoC 900 includes various components such as input-output (I/O) logic control 902 (e.g., to include electronic circuitry) and a microprocessor 904 (e.g., any of a microcontroller, processor core, application processor, or DSP). The SoC 900 also includes memory 906, which can be any type and/or combination of RAM, SRAM, DRAM, non-volatile memory, ROM, one-time programmable (OTP) memory, multiple-time programmable (MTP) memory, Flash memory, and/or other suitable electronic data storage. In the context of this disclosure, the memory 906 stores data, instructions, or other information via non-transitory signals, and does not include carrier waves or other transitory signals.

Alternately or additionally, SoC 900 may comprise a data interface (not shown) for accessing additional or expandable off-chip memory, such as external SRAM or Flash memory. SoC 900 may also include various applications, operating systems, software, and/or firmware, which can be embodied as processor-executable instructions maintained by memory 906 and executed by microprocessor 904. The SoC 900 may also include other communication interfaces, such as a transceiver interface 910 for controlling or communicating with components of a local or off-chip wireless transceiver.

The SoC 900 also includes a steering matrix generator 134, channel estimator 136, and norm sorter 138, which may be embodied as disparate or combined components, as described in relation to aspects presented herein. Examples of these components and/or entities, and their corresponding functionality, are described with reference to the respective components of the environment 100 shown in FIG. 1 and example device configurations shown in FIGS. 2 and 3. The steering matrix generator 134 and norm sorter 138, either in whole or part, can be implemented as processor-executable instructions maintained by the memory 906 and executed by the microprocessor 904 to implement various aspects and/or features described herein.

The steering matrix generator 134, either independently or in combination with other entities, can be implemented with any suitable combination of components or circuitry to implement aspects described herein. For example, the steering matrix generator 134 or norm sorter 138 may be implemented as part of a digital signal processor, arithmetic logic unit (ALU), matrix decomposer, and the like. The steering matrix generator 134 may also be provided integral with other entities of SoC 900, such as integrated with the microprocessor 904, a graphic processing unit, signal processing block, or vector processing block within the SoC 900. Alternately or additionally, the steering matrix generator 134 and other components can be implemented as hardware, firmware, fixed logic circuitry, or any combination thereof.

Although the subject matter has been described in language specific to structural features and/or methodological operations, it is to be understood that the subject matter defined in the appended claims is not necessarily limited to the specific features or operations described herein, including orders in which they are performed.

What is claimed is:

1. A method comprising:
receiving, via a channel, a sounding frame from a remote device;
determining, based the sounding frame, a channel covariance matrix that describes conditions of the channel;
decomposing, with an ortho-normal matrix, the channel covariance matrix to provide an intermediate matrix of vectors;
sorting, based on respective norms of the vectors, a vector of the intermediate matrix to provide a norm-sorted matrix of the vectors;
ortho-normalizing at least two of the vectors of the norm-sorted matrix to generate a steering matrix for the channel, wherein ortho-normalizing at least two of the vectors of the norm-sorted matrix includes:
i) making a first vector of the at least two vectors orthogonal to a second vector of the at least two vectors to provide first and second orthogonal vectors of the norm-sorted matrix; and
ii) scaling the first and second orthogonal vectors to provide first and second orthogonal unit vectors of the norm-sorted matrix; and
transmitting, to the remote device, the steering matrix for use in beamforming operations performed by the remote device.

2. The method as recited in claim 1, further comprising receiving, from the remote device, a transmission beamformed in accordance with the steering matrix.

3. The method as recited in claim 1, wherein sorting the vector of the intermediate matrix comprises sorting the vector in descending order of respective norm value.

4. The method as recited in claim 1, further comprising ortho-normalizing all of the vectors of the norm-sorted matrix to generate the steering matrix for the channel.

5. The method as recited in claim 1, wherein the steering matrix is a first iteration of the steering matrix and the method further comprises:
decomposing, with the ortho-normal matrix, the first iteration of the steering matrix to provide a subsequent intermediate matrix of vectors;
sorting, based on respective norms, at least two vectors of the subsequent intermediate matrix to provide a subsequent norm-sorted matrix; and
ortho-normalizing at least two of the vectors of the subsequent norm-sorted matrix to generate a second iteration of steering matrix for the channel.

6. The method as recited in claim 1, wherein decomposing the channel covariance matrix comprises multiplying the ortho-normal matrix with an exponential of the channel covariance matrix raised to at least the second power.

7. The method as recited in claim 1, wherein ortho-normalizing the at least two of the norm-sorted vectors comprises performing one of a Gram-Schmidt process, Householder transformation, Givens rotation, or Cholesky decomposition.

8. An apparatus for wireless communication, the apparatus comprising:
a receiver configured to receive data via a wireless medium;
a transmitter configured to transmit other data via the wireless medium;
a steering matrix generator configured to:
receive, via the receiver and through a channel of the wireless medium, a sounding frame transmitted by a remote device;
determine, based the sounding frame, a channel covariance matrix that describes conditions of the channel of the wireless medium;
multiply the channel covariance matrix with an ortho-normal matrix to compute an intermediate matrix of vectors having respective norm values;
sort, based on the respective norm values, a vector of the intermediate matrix to provide a norm-sorted matrix of the vectors;
ortho-normalize at least two of the vectors of the norm-sorted matrix to generate a steering matrix, wherein ortho-normalizing at least two of the vectors of the norm-sorted matrix includes:
i) making a first vector of the at least two vectors orthogonal to a second vector of the at least two vectors to provide first and second orthogonal vectors of the norm-sorted-matrix; and
ii) scaling the first and second orthogonal vectors to provide first and second orthogonal unit vectors of the norm-sorted matrix; and
transmit, via the transmitter and through the channel of the wireless medium, the steering matrix to the remote device for use in beamforming operations performed by the remote device.

9. The apparatus as recited in claim 8, wherein sorting the vectors of the intermediate matrix comprises:
sorting the respective norm values of the vectors in descending order; and
re-ordering, based on the descending order of the respective norm values, the vectors of the intermediate matrix to provide the norm-sorted matrix of the vectors.

10. The apparatus as recited in claim 8, wherein the steering matrix generator is further configured to ortho-normalize all of the vectors of the norm-sorted matrix to generate the steering matrix.

11. The apparatus as recited in claim 8, wherein multiplying the channel covariance matrix with the ortho-normal matrix comprises multiplying the ortho-normal matrix with an exponential of the channel covariance matrix that is raised to at least the second power.

12. The apparatus as recited in claim 8, wherein the apparatus is configured to communicate via M antennas, the remote device is configured to communicate via N antennas, and a channel matrix from which the channel covariance matrix is determined comprises an M×N matrix that describes the conditions of the channel.

13. The apparatus as recited in claim 8, wherein the apparatus is embodied as one of an access point, wireless router, smart-phone, laptop computer, tablet computer, netbook, network-attached storage device, network interface module, wearable computer, set-top box, personal media device, smart-television, or gaming device.

14. A System-on-Chip (SoC) comprising:
an interface for a receiver of wireless communications;
an interface for a transmitter of wireless communications:
a hardware-based processor;
a memory storing processor-executable instructions that, responsive to execution by the hardware-based processor, implement a steering matrix generator to:

receive, via the receiver and from a remote device, a sounding frame through a channel of a wireless medium;

determine, based the sounding frame, a channel covariance matrix that describes conditions of the channel;

decompose, with an ortho-normal matrix, the channel covariance matrix to provide an intermediate matrix of vectors;

sort, based on respective norms of the vectors, a vector of the intermediate matrix to provide a norm-sorted matrix of the vectors;

ortho-normalize at least two of the vectors of the norm-sorted matrix to generate a steering matrix for the channel of the wireless medium, wherein ortho-normalizing at least two of the vectors of the norm-sorted matrix includes:
i) making a first vector of the at least two vectors orthogonal to a second vector of the at least two vectors to provide first and second orthogonal vectors of the norm-sorted-matrix; and
ii) scaling the first and second orthogonal vectors to provide first and second orthogonal unit vectors of the norm-sorted matrix; and transmit, via the transmitter, the steering matrix to the remote device for use in beamforming operations performed by the remote device.

15. The SoC as recited in claim 14, wherein to sort the vector of the intermediate matrix comprises sorting the vector in descending order of respective norm value.

16. The SoC as recited in claim 14, wherein the steering matrix generator is further implemented to ortho-normalize all of the vectors of the norm-sorted matrix to generate the steering matrix.

17. The SoC as recited in claim 14, wherein to decompose the channel covariance matrix comprises multiplying the ortho-normal matrix with an exponential of the channel covariance matrix raised to at least the second power.

18. The SoC as recited in claim 14, wherein the SoC is embodied as or part of a baseband processor, media access controller, wireless network interface, access point controller, or wireless communication chipset.

19. The SoC as recited in claim 14, wherein the steering matrix is a first iteration of the steering matrix and the steering matrix generator is further implemented to:
decompose, with the ortho-normal matrix, the first iteration of the steering matrix to provide a subsequent intermediate matrix of vectors;
sort, based on respective norms, at least two vectors of the subsequent intermediate matrix to provide a subsequent norm-sorted matrix; and
ortho-normalize at least two of the vectors of the subsequent norm-sorted matrix to generate a second iteration of steering matrix for the channel.

20. The SoC as recited in claim 14, wherein ortho-normalizing the at least two of the norm-sorted vectors comprises performing one of a Gram-Schmidt process, Householder transformation, Givens rotation, or Cholesky decomposition.

* * * * *